Figure 1:
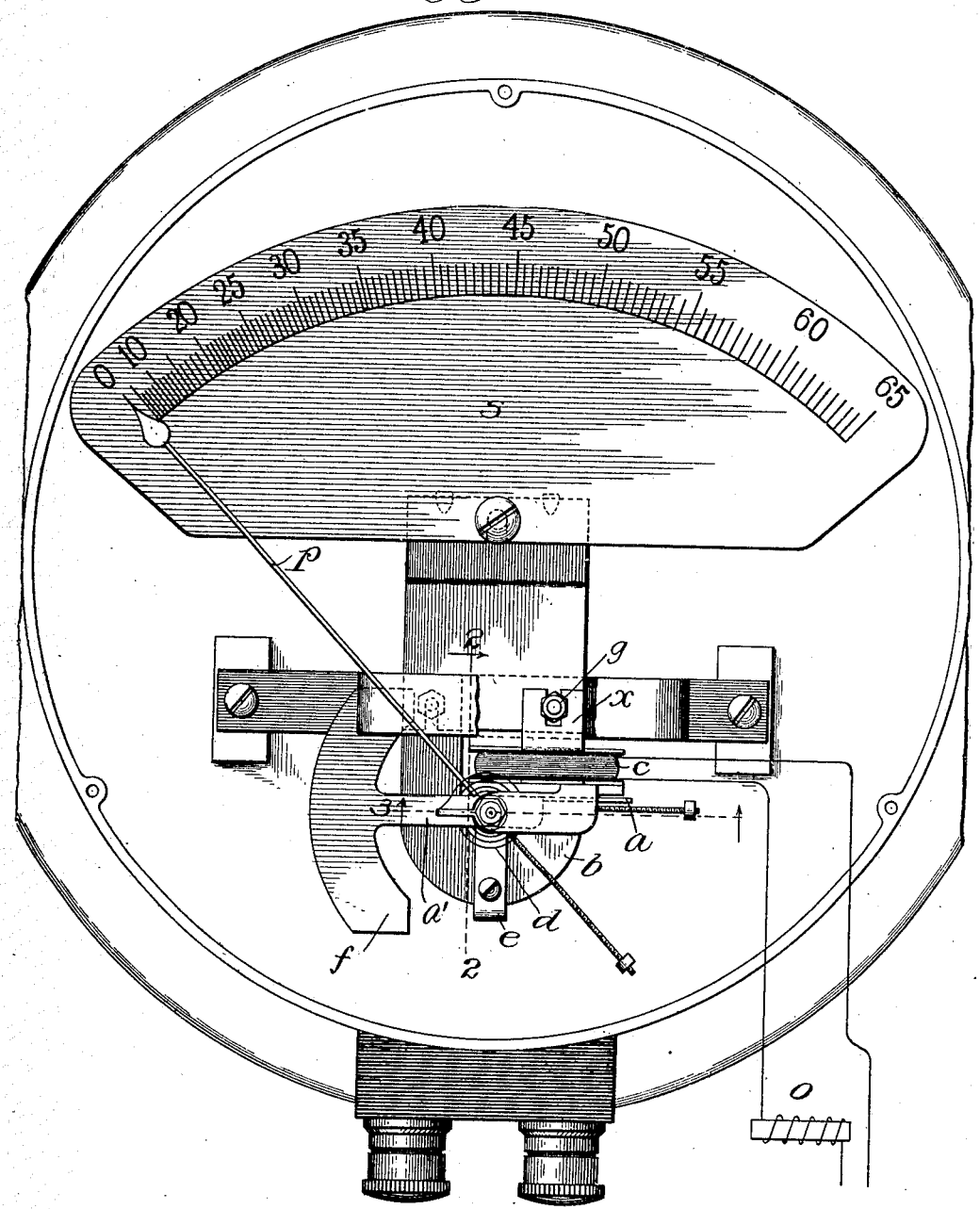

No. 870,632. PATENTED NOV. 12, 1907.
J. M. LEA.
ELECTRICAL MEASURING INSTRUMENT.
APPLICATION FILED JUNE 4, 1906.

3 SHEETS—SHEET 1.

Witnesses:
G. E. Falk
A. S. Moore

Inventor:
John M. Lea
By Barton & Launer
Attys.

No. 870,632. PATENTED NOV. 12, 1907.
J. M. LEA.
ELECTRICAL MEASURING INSTRUMENT.
APPLICATION FILED JUNE 4, 1906.
3 SHEETS—SHEET 2.
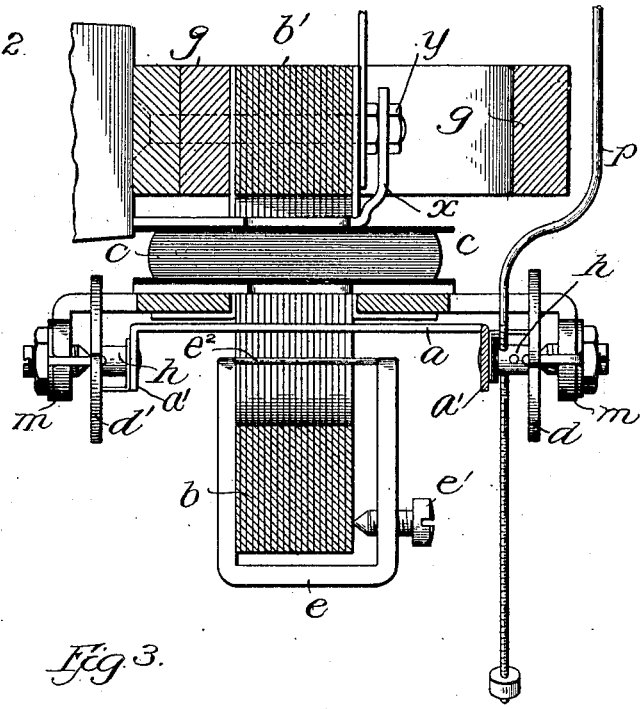
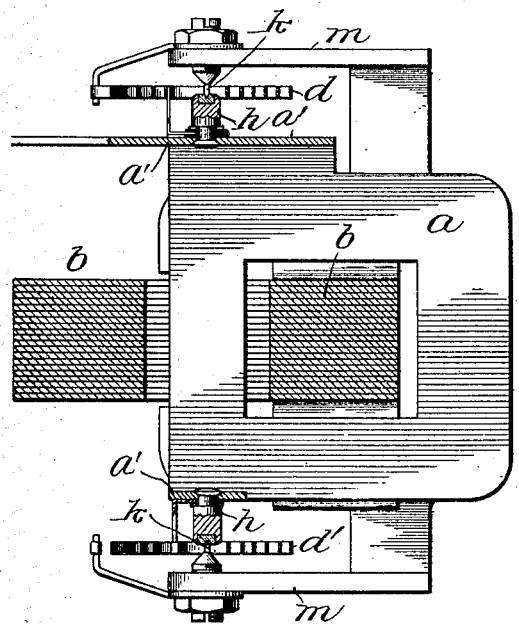
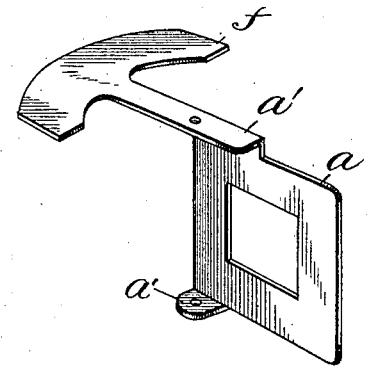
Witnesses:
Inventor:
John M. Lea, No. 870,632. PATENTED NOV. 12, 1907.
J. M. LEA.
ELECTRICAL MEASURING INSTRUMENT.
APPLICATION FILED JUNE 4, 1906.
3 SHEETS—SHEET 3.
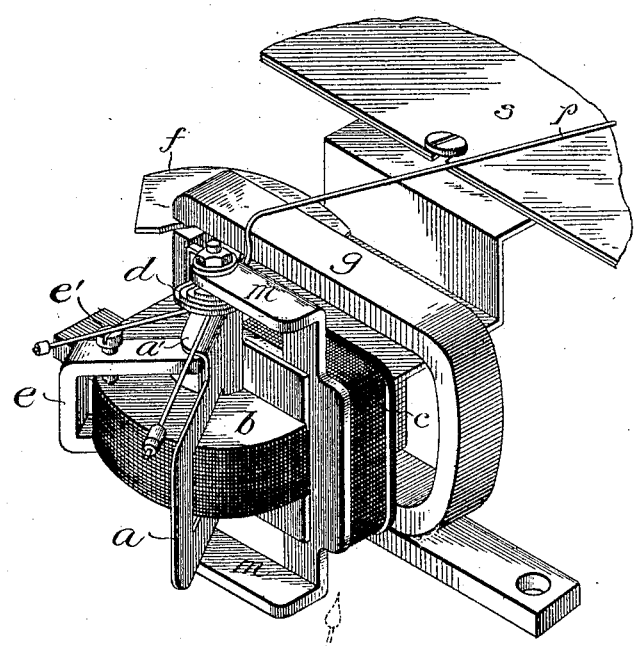
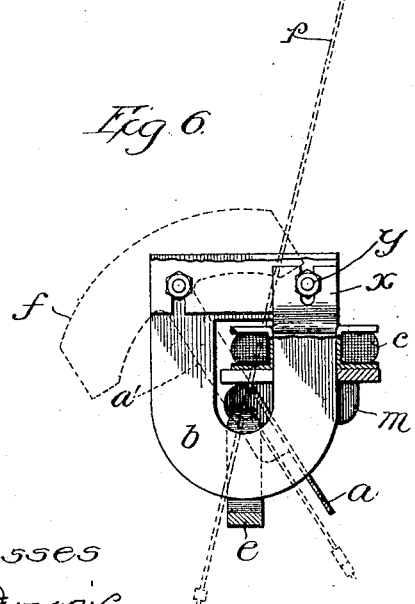
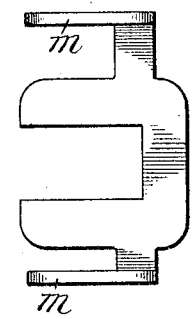
Witnesses
Inventor:
John M. Lea,

UNITED STATES PATENT OFFICE.

JOHN M. LEA, OF CHICAGO, ILLINOIS, ASSIGNOR TO INTERNATIONAL ELECTRIC METER COMPANY, OF CHICAGO, ILLINOIS, A CORPORATION OF ILLINOIS.

ELECTRICAL MEASURING INSTRUMENT.

No. 870,632.   Specification of Letters Patent.   Patented Nov. 12, 1907.

Application filed June 4, 1906. Serial No. 319,979.

*To all whom it may concern:*

Be it known that I, JOHN M. LEA, a citizen of the United States, residing at Chicago, in the county of Cook and State of Illinois, have invented a certain new and useful Improvement in Electrical Measuring Instruments, of which the following is a full, clear, concise, and exact description.

My invention relates to electrical measuring instruments, more particularly such as are intended for the measurement of alternating currents, and its object is to provide a simple and effective device of this character which will be sensitive and accurate under such varying conditions as are commonly met with in practice, without requiring auxiliary devices or special adjustment for each variation in conditions. I also propose an instrument which will be cheaply constructed, strong and not liable to be easily put out of order.

In its elements this instrument embodies the principle of a transformer, consisting of a primary or exciting coil adapted to carry the current to be measured, and a secondary element or coil linked in inductive relation to the primary by a suitable laminated iron core preferably constructed to provide a completely closed magnetic circuit. The primary and secondary elements are so mounted as to have a relative movement under the influence of their mutual repulsion when the primary is traversed by an alternating current. Such movement is opposed by suitable means, such as a spring, so that the extent of movement will be dependent upon the strength of the exciting current and will serve to indicate such current strength. To increase the sensitiveness of the instrument, I provide a supplementary secondary coil or element upon the core in such position that the effect of the induced currents therein will tend to increase the movement produced by the repulsive effect of the primary. Thus the movable secondary element may be arranged to oscillate along the core between the fixed primary coil on the one hand and a fixed secondary element or coil on the other hand, being simultaneously repelled by the primary and attracted by the fixed secondary.

I will describe my invention more particularly and set forth certain further features thereof by reference to the accompanying drawing, which illustrates an instrument constructed in accordance therewith.

Figure 1 is a plan view of the instrument; Fig. 2 is a vertical sectional view taken on line 2—2 of Fig. 1; Fig. 3 is a vertical sectional view taken on line 3—3 of Fig. 1; Fig. 4 is a detail perspective view of the moving element. Fig. 5 is a detail perspective view of the operating mechanism; Fig. 6 is a detail view of the closed core and associated parts; and Fig. 7 is a detail view of the supporting frame which is mounted upon the core and carries the pivot pins for the moving element.

The same letters of reference indicate the same parts wherever they are shown.

In the instrument illustrated the moving element consists of a metal frame $a$, preferably of aluminium, which is supported upon pivots at the top and bottom to oscillate through a certain arc along a core $b$, which extends through a central opening in the said metal frame. The core $b$ is of U-shape, the metal frame being pivoted to swing in an arc determined by the curvature of the U. The arms of the U are closed by a cross piece $b^1$, so that the core provides a completely closed magnetic circuit. Upon one of the arms of the U-shaped core is provided the primary or exciting coil $c$, and normally the frame $a$, constituting the secondary coil or element, keeps a position upon the core adjacent to the exciting coil. It is evident that when the exciting coil $c$ is energized by an alternating current, the secondary element $a$ will have currents induced therein, the result of which will be a mutual repulsion between the elements $a$ and $c$. Under the influence of this mutual repulsion, the frame $a$ will therefore turn upon its pivots, swinging around the curved portion of the core. Coiled springs $d\ d^1$ are arranged to act upon the movable element $a$ to offer a constantly increasing resistance to its motion when repelled by the primary. A fixed secondary element or coil $e$ is also provided upon the core at the limit of the arc through which the movable element is intended to swing. This fixed secondary element may consist of a simple collar of metal forming a "coil" of a single turn. I have shown a portion of this collar cut away and the gap spanned by smaller conductors $e^2$. By changing the number of these wires in parallel across the gap, or using wires of different sizes, the resistance of the fixed secondary element may be adjusted within certain limits. The collar $e$ is adapted to be adjusted at various positions along the core during the calibration of the instrument, a set screw $e^1$ being provided to fix the coil in its finally adjusted position. In order that the moving element of the instrument may come to rest quickly in any position to which it may be moved under the influence of a current traversing the exciting coil, I provide a sheet metal vane $f$, which is carried by the moving element, and is arranged to swing in an air gap between the poles of a powerful permanent magnet $g$, which acts as a damper. Preferably the frame $a$ and the metal vane $f$ are formed integrally from a single sheet of metal, which is stamped out to form the closed loop or secondary coil, and integrally formed ears $a^1\ a^1$ are struck out at an angle from the top and bottom of the frame to form lugs upon which the pivot posts $h\ h$ may be mounted. The vane $f$ may be formed as an extension of the upper ear $a^1$. The posts $h\ h$ may be fitted with jewel bearings in which the points of pivot pins $k\ k$ are adapted to enter. The pivot pins may be supported in brackets $m$ of the frame of the instrument, being screwed through said brackets so as to be adjustable therein.

The moving element of the instrument is provided with an indicating needle or pointer $p$, which may be fixed to the upper pivot post $h$, and is arranged to move over a scale $s$ to indicate upon said scale the extent of movement, and therefore the strength of the current producing such movement.

The metal supporting frame for the exciting coil $c$ should be so constructed that it will not present a complete electric circuit around the core, in order to avoid forming a useless secondary circuit around the core.

The operation of the instrument is as follows: The primary or exciting coil $c$ is connected so as to be traversed by the alternating current to be measured. The apparatus will then act like a transformer, inducing a current in the closed secondary element $a$ in opposite direction to the exciting current in the coil $c$. The elements $a$ and $c$ will therefore mutually repel each other, and the movable element $a$ will swing around the core in a direction away from the exciting coil, and against the resistance provided by the springs $d\ d$. A current will also be induced in the fixed secondary element $e$, as well as in the movable secondary $a$, and these two currents, being in the same direction, will cause a mutual attraction between $a$ and $e$, tending to assist the movement which is produced by the mutual repulsion between $a$ and $c$. When the force tending to rotate the movable element is balanced by the opposing force of the springs $d\ d$, the parts will come to rest, undue oscillation being prevented by the action of the damping magnet $g$ upon the vane $f$, which action will be readily understood by those skilled in the art. In its movement the secondary element $a$ carries the pointer $p$ across the scale $s$ to indicate upon said scale the extent of such movement, and consequently the strength of the exciting current by which it is produced.

The adjustable fixed secondary element $e$ is made of comparatively large cross section, so as to carry a large portion of the secondary current, allowing the movable secondary element to be made light, without danger of heating, and at the same time obtaining a large deflection by a very small expenditure of energy. As the attractive force of the fixed secondary upon the movable secondary is increased as the latter approaches the end of its travel, it will be seen that the instrument will give comparatively large deflections for a given increase in current as such current approaches the maximum for which the instrument is designed, thereby giving approximately even divisions for the last two-thirds of the scale instead of shortening the divisions toward the end as would otherwise be the case.

An instrument of this type may be made substantially constant under varying conditions of frequency and wave form of the current to be measured. Constancy under varying conditions is accomplished by proportioning the number of turns of wire in the exciting coil, so that it will have a reactance which will practically compensate for the change in other conditions due to changes in frequency as will be hereinafter explained. The scale should be at least a 90° arc, and consequently there must be considerable space between the primary and the fixed secondary to allow for the swing of the movable secondary. A certain number of ampere turns are, therefore, required on the primary to overcome all losses and cause a full scale deflection of the secondary element. The power required to get full scale deflection at the time the meter is compensated should be as small as possible, as is well understood.

Calibration is effected in the following manner: The instrument is first connected in a circuit of suitable value and frequency, the number of turns, size and resistance of wire on the primary having been approximately predetermined for the capacity desired. The value of the full scale deflection is noted and if not satisfactory, resistance is added or subtracted in the usual way, as the case may demand, and the divisions on the scale are now "stepped off" with the current. It is immaterial whether the resistance is wound non-inductively or not. Now, if upon changing the frequency any large amount, say from one hundred to five hundred percent, or to whatever second value is selected, a serious change in the reading is noted, this change can be eliminated by properly adjusting the reactance and resistance. This is accomplished by actually changing the number of turns upon the primary or perhaps more conveniently by adjusting the self-inductance of the primary by a change in position of the adjustable secondary, previously mentioned, and adjusting the primary resistance until full scale deflection, at the proper value, is again attained. The adjustment having been properly made, the meter will now give practically correct reading on all frequencies generally used and exactly correct upon the two frequencies for which it was adjusted.

Assume any position of the secondary coil due to a certain current at a certain frequency and voltage. (The magnetizing power is a function of the ampere-turns, but as the number of turns is constant, I will speak of current in this explanation.) Now the current required to keep the assumed position against the force of the springs will be divided as follows: A small amount of current is consumed in core losses and the remaining current produces the useful and the leakage flux, the value of the latter being very large as compared with its value in a properly designed transformer. Now let the frequency increase and the magnetizing current will decrease, the induction in the iron being inversely proportional to the frequency. The core losses being proportional to some power, above the first, of the induction and only the first power of the frequency, will change with the induction and will decrease. The current will decrease a small amount depending upon the proportion of the exciting current to the total current necessary to cause the deflection selected. A change to a lower frequency would cause the current to increase for reasons just stated. Now the meter having a certain resistance, this change will cause a change in the fall of potential across the meter, due to the resistance "drop", and the meter would, therefore, give a lower reading for low than for high frequencies. When, however, the time constant, or self-induction, of the meter is the proper amount, the reactance "drop" decreases due to decreased frequency and increased core losses to the same extent that the resistance "drop" increases due to increased exciting current, and the total drop is practically the same. The reactance of the primary is suitably large on account of the large leakage induction between the primary and secondary. For instance, suppose we have a meter of a large number of turns of wire and small resistance and assume that we take fall of potential readings across the meter at widely different frequencies, the position of the index remaining the same. The fall of potential will be greater for the higher frequency as the reactance "drop" makes a greater change than the resistance "drop". Now, by adding resistance in small increments, the total "drop" gradually increases and the readings at the two frequencies gradually approach each other until they cross. When this happens, compensation is attained. By adding more resistance, the potential at the lower frequency will be higher and the meter will be over-compensated; that is, the change in resistance "drop" between frequencies will be greater than the reverse change in reactance "drop."

It will be understood that where desirable an impedance coil $o$ may be placed in series in the primary circuit in order to adjust the reactance to the desired value. Or again, the initial distance between the primary and the movable secondary may be adjusted so as to adjust the value of the initial leakage inductance. This adjustment will be understood by reference to Figs. 1, 2 and 6. The frame carrying the primary coil is movable to and fro along the core; and the coil frame is provided with a slotted ear $x$, extending along the core and adapted to be engaged by a set-screw or nut $y$ to secure the ear and its attached coil frame in any position to which it may be adjusted. As shown in Fig. 2, the set nut $y$ screws upon the projecting end of the bolt (shown in dotted lines) which passes through the core $b$ and holds it in place.

The meter remains constant under varying temperature conditions, within wide limits, for the following reasons: An increase in temperature, which increases the resistance of both primary and secondary would tend to cut down the current in the meter, and decrease the deflection; but the decrease in current in the secondary, consequent upon its own resistance, cuts down its demagnetizing effect upon the primary, so largely compensating for the changed condition.

The instrument remains constant under varying conditions of wave form of the primary current. Any change in wave-form which would affect the efficiency of the transformer, requiring a greater or less expenditure of energy in magnetization, produces a change in the value of the secondary current, and, consequently, a change in the deflection, the primary supply remaining the same. But this change in position would change the value of the magnetic leakage between the primary and secondary and the change in wave-form changes the value of the maximum induction, which would also change the leakage value, all effects acting together to overcome the tendency toward changing the deflection. Thus, a change to a more blunt wave-form would cause a greater expenditure of energy in magnetizing the core, but it would also decrease the leakage between the primary and movable secondary, so that more current will flow in the movable secondary, the resultant deflection remaining practically the same. However, the working current is so large as compared with the exciting current that the small possible change in core loss due to change in wave-form could hardly be evident in the deflection.

The meter is only slightly affected by external fields, and can be placed in an iron case. The needle is properly poised and counter-balanced, and the spiral springs are coiled in opposite directions so as to compensate for changes due to temperature. It will be appreciated that the mechanism is compact, light and easily constructed, being suitable for either portable or switch-board instruments.

I claim:—

1. In an electrical measuring instrument, the combination with a stationary exciting coil, a movable closed secondary coil and a laminated iron core linking said coils in mutual inductive relation, of an additional closed secondary coil around said core stationarily mounted in position to exert an attractive force upon the movable secondary in a direction to assist the repelling force exerted by the primary.

2. In an electrical measuring instrument, the combination with a core, of a primary and a secondary coil fixed upon said core at a distance apart, a movable secondary coil mounted to oscillate along the core between said fixed coils, and an indicator moved by said movable secondary coil.

3. A movable secondary element for a transformer-type measuring instrument comprising a sheet-metal frame cut in the form of a closed loop having integrally-formed ears turned at an angle at opposite ends thereof, pivot-posts mounted upon said ears, and a damping vane formed by an extension of one of said ears.

4. In an electrical measuring instrument, the combination with a closed transformer-core, and the primary coil thereon, of a flat sheet-metal frame forming a closed loop surrounding said core and constituting a movable secondary element of the transformer, said frame having ears struck out integral therewith, pivot posts mounted upon said ears, pivot pins having their points entering bearings in said posts, and a spiral spring connected to oppose the repulsion of said secondary element by said primary coil.

5. In an electrical measuring instrument, the combination with a transformer core, primary and secondary coils thereon at a distance apart, said secondary coil being adjustable to and from the primary, of a freely movable secondary coil mounted to oscillate along the core between said fixed coils.

6. In an electrical measuring instrument, the combination with a core, of a stationary primary coil on said core, included in a primary energizing circuit, a secondary coil also on said core in inductive relation to the primary and mounted to oscillate on said core toward or from said primary, means for adjusting the reactance and resistance of the circuit including said primary coil, said circuit having its reactance and resistance so proportioned that the effect of its change in impedance under changes in frequencies of the primary current approximately balances the effect of changes in magnetizing current, and means for indicating the extent of movement of said secondary coil.

7. In an electrical measuring instrument, the combination with a core, of a primary and a secondary coil fixed upon said core at a distance apart, a movable secondary coil mounted to oscillate along the core between said fixed coils, said primary coil having such a number of turns that the effect of its change in impedance approximately balances the effect of changes in magnetizing current under changes in frequency of the primary current, and an indicator moved by said movable secondary coil.

In witness whereof, I, hereunto subscribe my name this 2nd day of June A. D., 1906.

JOHN M. LEA.

Witnesses:
ALFRED H. MOORE,
IRVING MACDONALD.